United States Patent
Kato

(10) Patent No.: US 8,187,741 B2
(45) Date of Patent: May 29, 2012

(54) ALKALINE BATTERY

(75) Inventor: Susumu Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 367 days.

(21) Appl. No.: 12/671,384

(22) PCT Filed: Aug. 31, 2009

(86) PCT No.: PCT/JP2009/004257
§ 371 (c)(1),
(2), (4) Date: Jan. 29, 2010

(87) PCT Pub. No.: WO2010/058501
PCT Pub. Date: May 27, 2010

(65) Prior Publication Data
US 2011/0020691 A1 Jan. 27, 2011

(30) Foreign Application Priority Data
Nov. 18, 2008 (JP) .................. 2008-294265

(51) Int. Cl.
*H01M 2/14* (2006.01)
*H01M 4/50* (2010.01)
*H01M 4/42* (2006.01)
(52) U.S. Cl. ........................ 429/129; 429/163
(58) Field of Classification Search .............. 429/129
See application file for complete search history.

(56) References Cited

U.S. PATENT DOCUMENTS

2004/0009394 A1* 1/2004 Ito et al. ............... 429/206
2005/0106461 A1 5/2005 Moore et al.

FOREIGN PATENT DOCUMENTS

| JP | 10-144304 | 5/1998 |
| JP | 2000-106176 | 4/2000 |
| JP | 2000-340237 | 12/2000 |
| JP | 2003-163003 | 6/2003 |
| JP | 2007-511883 | 5/2007 |
| JP | 2007-227011 | 9/2007 |
| JP | 2008-108585 | 5/2008 |

* cited by examiner

*Primary Examiner* — Patrick Joseph Ryan
*Assistant Examiner* — Brent Thomas
(74) *Attorney, Agent, or Firm* — McDermott Will & Emery LLP

(57) ABSTRACT

The present invention provides an alkaline battery which has high reliability and high cost performance and does not cause an internal short circuit resulting from gel leakage even when the filling densities of the positive and negative electrodes are reduced. In the alkaline battery, a positive electrode 2 contains manganese dioxide as a positive electrode active material, a negative electrode 3 is a gel negative electrode containing zinc as a negative electrode active material, a filling density of manganese dioxide in the positive electrode 2 is in a range of 2.31 to 2.45 g/cm$^3$, a filling density of zinc in the negative electrode 3 is in a range of 1.49 to 1.65 g/cm$^3$, and a ratio (h1/h2) between a height of the positive electrode 2 (h1) and a height of the negative electrode 3 (h2) is in a range of 0.96 to 1.06.

7 Claims, 2 Drawing Sheets

ALKALINE BATTERY

RELATED APPLICATIONS

This application is the U.S. National Phase under 35 U.S.C. §371 of International Application No. PCT/JP2009/004257, filed on Aug. 31, 2009, which in turn claims the benefit of Japanese Application No. 2008-294265, filed on Nov. 18, 2008, the disclosures of which Applications are incorporated by reference herein.

TECHNICAL FIELD

The present invention relates to alkaline batteries in which filling densities of positive and negative electrodes are reduced.

BACKGROUND ART

For their high energy density per unit weight, alkaline batteries have widely been used as power sources of portable electronic devices which have rapidly been spread in recent years. Today, there are various alkaline batteries different in grades and price ranges adapted to different devices and applications, including regular alkaline batteries having a good discharge characteristic under a light load suitable for devices such as handheld game machines, high-performance alkaline batteries having a good discharge characteristic under a heavy load suitable for devices such as digital still cameras, and high-quality and high-performance alkaline batteries having a good discharge characteristic in a wide range from a high current to a low current.

For the purpose of improving the performance of the alkaline batteries, various improvements have been done, e.g., by increasing the amount and specific surface area of an active material, or by increasing the amount of an electrolyte absorbed in a material mixture containing the active material (e.g., see Patent Documents 1 and 2).

[Patent Document 1] Published Japanese Patent Application No. 2003-163003
[Patent Document 2] Published Japanese Patent Application No. 2000-106176

DISCLOSURE OF THE INVENTION

Problem that the Invention is to Solve

For the manufacture of low-grade, low-cost batteries compared with high-grade, high-performance batteries, it is most effective to reduce the amount of a positive and/or negative electrode active material.

In general, an alkaline battery is constituted of a positive electrode and a negative electrode placed in a battery case with a separator interposed therebetween. When the amount of the positive and/or negative electrode is simply reduced, the area in which the positive and negative electrodes oppose each other is decreased, and therefore reaction efficiency deteriorates.

Instead of simply reducing the amount of the positive and/or negative electrode, reducing the filling densities of the positive and negative electrodes is preferable for minimizing the deterioration in reaction efficiency as much as possible and reducing the cost, while the heights of the positive and negative electrodes are unchanged.

The present inventor has prepared alkaline batteries in which the filling densities of the positive and negative electrodes are reduced, and evaluated their performance. The alkaline batteries were prepared using manganese dioxide containing graphite as the positive electrode and zinc containing a gelling agent as the negative electrode.

A drop test of the prepared alkaline batteries was performed to evaluate reliability of the batteries. As a result, some of the batteries generated heat, which may possibly be derived from an internal short circuit. Particularly among the batteries dropped with the negative electrode terminal side of the battery oriented downward (an opening of the battery case is sealed with a negative electrode terminal plate with a gasket interposed therebetween), the ratio of batteries that generated heat was high.

When a battery has an impact thereon, a gel negative electrode, which is flowable by nature, moves toward the negative electrode terminal side (the gasket side) of the battery and hits the gasket. Then, the gel negative electrode leaks from a gap between the separator and the gasket toward the positive electrode (hereinafter, this is simply called "gel leakage"). This is considered as a cause of the internal short circuit. In particular, when the filling density of the negative electrode is reduced, a network of zinc particles becomes less dense, and therefore the gel negative electrode becomes less viscous. Therefore, the gel negative electrode reduced in filling density is more likely to move upon impact. For this reason, it is presumed that the ratio of the batteries that generated heat due to the internal short circuit was raised.

In view of the foregoing, the present invention has been developed. A major object of the present invention is to provide an alkaline battery which has high reliability and high cost performance and does not cause the internal short resulting from the gel leakage circuit even when the filling densities of the positive and negative electrodes are reduced.

Means of Solving the Problem

In order to achieve the object, regarding an alkaline battery including a positive electrode and a negative electrode which are reduced in filling density and placed in a battery case with a separator interposed therebetween, the present invention offers a ratio between a height of the positive electrode and a height of the negative electrode set within a range of 0.96 to 1.06.

Specifically, an alkaline battery of the present invention includes a positive electrode and a negative electrode placed in a battery case with a separator interposed therebetween, wherein the positive electrode contains manganese dioxide as a positive electrode active material, the negative electrode is a gel negative electrode containing zinc as a negative electrode active material, a filling density of manganese dioxide in the positive electrode is in a range of 2.31 to 2.45 g/cm$^3$, a filling density of zinc in the negative electrode is in a range of 1.49 to 1.65 g/cm$^3$, and a ratio (h1/h2) between a height of the positive electrode (h1) and a height of the negative electrode (h2) is in a range of 0.96 to 1.06.

In a preferred embodiment, the ratio (h1/h2) between the height of the positive electrode (h1) and the height of the negative electrode (h2) is in a range of 0.98 to 1.04.

In a preferred embodiment, an arithmetic surface roughness (Ra) of an inner wall surface of the battery case is in a range of 0.7 to 2.0 μm.

In a preferred embodiment, the zinc is zinc powder, in which zinc powder having a particle size of 200 mesh or lower is contained in a range of 15 to 40 wt %.

In a preferred embodiment, the separator has a thickness in a range of 350 to 550 μm.

Effect of the Invention

The present invention allows providing an alkaline battery which has excellent reliability and high cost performance, and does not cause the internal short circuit resulting from the gel leakage even when the positive and negative electrodes are reduced in filling density.

BEST MODE FOR CARRYING OUT THE INVENTION

In general, an alkaline battery is configured of a positive electrode and a negative electrode placed in a battery case with a separator interposed therebetween. For high reaction efficiency between the positive and negative electrodes, the height of the positive electrode and the height of the negative electrode are designed to be equalized to maximize the area in which the positive and negative electrodes oppose each other.

In the mass production process, however, the height of the gel negative electrodes may become less uniform due to variations in production. In view of the fact that the ratio of the batteries that generated heat due to the internal short circuit resulting from the gel leakage was increased after the drop test performed on the batteries including the positive and negative electrodes reduced in filling density, the inventor of the present invention has examined the relationship between the variation in negative electrode height and the heat generation of the batteries in the drop test. As a result, the inventor has reached the following finding.

Table 1 shows the evaluation results of the drop test performed on the batteries in which the positive electrode height (h1) and the negative electrode height (h2) are not equal. The variation in positive electrode height and that in negative electrode height are typically about 2 to 4%. In this test, however, the batteries in which the positive electrode height (h1) and the negative electrode height (h2) were varied in advance were prepared and evaluated so that the relationship between the variation in negative electrode height and the heat generation of the battery can clearly be understood.

TABLE 1

| | | Positive electrode height (h1) | | | | | | | |
|---|---|---|---|---|---|---|---|---|---|
| | | 43.5 mm | | | | 4.05 mm | | | |
| | | Battery | | Drop test result | | Battery | | Drop test result | |
| | | No. | h1/h2 | A | B | C | No. | h1/h2 | A | B | C |
| Negative electrode height (h2) | 43.0 mm | 1 | 1.01 | 0/10 | 0/10 | 0/10 | 2 | 0.94 | 5/10 | 4/10 | 3/10 |
| | 40.2 mm | 3 | 1.08 | 4/10 | 3/10 | 1/10 | 4 | 1.01 | 0/10 | 0/10 | 0/10 |

The batteries were LR6 alkaline batteries prepared using manganese dioxide containing graphite as the positive electrode and zinc containing a gelling agent as the negative electrode. The filling density of manganese dioxide in the positive electrode was 2.38 $g/cm^3$, and the filling density of zinc in the negative electrode was 1.57 $g/cm^3$. The selected filling density of manganese dioxide corresponds to an about 5% reduced value of the filling density of manganese dioxide adopted to high-grade, high-performance batteries (typically about 2.50 $g/cm^3$), and the selected filling density of zinc corresponds to an about 9% reduced value of the filling density of zinc adopted to the high-grade, high-performance batteries (typically about 1.72 $g/cm^3$).

The drop test and the evaluation were performed in the following manner.

Prior to the drop test, closed circuit voltages (V1) of the prepared batteries were measured (at an accuracy of 1 mV). Then, each battery was dropped onto a plastic tile ten times in a row from a height of 1.5 m with the negative electrode terminal side of the battery oriented downward. After that, a closed circuit voltage (V2) immediately after the drop test, a closed circuit voltage (V3) after one minute, and maximum surface temperature (T) of the battery after the drop test were measured. The drop test was performed on the batteries 1 to 4 indicated in Table 1, 10 pieces each. Among the tested batteries, those in which V2 was smaller than V1 by 2 mV or more were ranked A, those in which V3 was smaller than V2 were ranked B, and those in which T was increased to 40° C. or higher were ranked C. The number of the ranked batteries was counted.

It is assumed that the batteries ranked A were those suspected of having had the gel leakage, the batteries ranked B were those in which a gradual internal short circuit occurred as a result of the gel leakage, and the batteries ranked C were those in which the internal short circuit resulting from the gel leakage progressed considerably to cause heat generation.

As shown in Table 1, one of the batteries 3 in which the negative electrode height was short generated heat (rank C). In contrast, the batteries 1 in which the negative electrode was tall did not generated heat, and they were not rated even A or B. This clearly indicates that whether the battery generates heat or not depends on the difference in negative electrode height. The batteries 1 including the tall negative electrode and the batteries 3 including the short negative electrode were different in distance between the negative electrode and the gasket. Therefore, the batteries 1 and 3 were different in strength of the impact caused on the gasket, which was caused when the negative electrode moved toward the negative electrode terminal (toward the gasket) upon impact of the drop. Thus, it is considered that some batteries experienced the gel leakage, and the other not, depending on the difference in impact intensity.

Table 1 also indicates that the batteries 4 including the short negative electrode did not generate heat, while some of the batteries 2 including the tall negative electrode generated heat. This implies that the heat generation resulting from the gel leakage was not caused only by the above-described movement of the gel negative electrode. The present inventor has conducted a closer study in the belief that there may be other factor of the gel leakage than the movement of the gel negative electrode. As a result, the present inventor has reached the following finding.

FIG. 1(a) shows the structure of a battery including a positive electrode 2 and a negative electrode 3 which are reduced in filling density and placed in a battery case with a separator 4 interposed therebetween. Space A is formed between the positive and negative electrodes 2 and 3 and the gasket 5 (FIG. 1(c) shows an X-ray photograph of this battery). FIG. 1(b) shows the battery after dropped with the negative electrode terminal side of the battery oriented downward. In this figure, not only the negative electrode 3, but the positive electrode 2, have moved toward the negative electrode terminal and come into contact with the gasket 5, and therefore space B is formed on the positive electrode terminal side of the battery (FIG. 1(d) shows an X-ray photograph of this battery).

In general, the positive electrode placed in the battery case expands in the radial direction of the battery case as it absorbs an electrolyte solution, and comes into close contact with the battery case. Therefore, it has been considered that the positive electrode does not move even when the battery has an impact thereon. However, when the positive electrode is reduced in filling density, the contact between the positive electrode and the battery case becomes less tight. This is considered as a reason of the movement of the positive electrode together with the negative electrode upon impact on the battery.

Based on this fact, a possible reason why the batteries 4 of Table 1 including the short negative electrode did not generate heat may be considered as follows. Specifically, since the positive electrode in the batteries 4 was also short, the separator also moved as the positive electrode moved, and a contact length of an end part of the separator in contact with the gasket was increased. Therefore, the separator, which is improved in close contact with the gasket because of the increased contact length, suppressed the occurrence of the gel leakage even when the negative electrode moved and hit the gasket hard.

A possible reason why the batteries 2 of Table 1 including the tall negative electrode generated heat, unlike the batteries 1, may be considered as follows. Specifically, in the batteries 2, the positive electrode height was shorter than the negative electrode height. Therefore, the negative electrode hit the gasket first, and then the positive electrode did. As the separator was pressed by the moved positive electrode, the adhesion between the separator and the gasket deteriorated, and the gel leakage occurred.

From the foregoing observation, it has been confirmed that, when the positive electrode height and the negative electrode height vary due to the variation in production, and when the variation in positive electrode height and the variation in negative electrode height exceed a certain range, the gel leakage may possibly occur, though the factor for the gel leakage is different. Therefore, regarding the batteries using the positive and negative electrodes reduced in filling density, it is necessary to control a balance between the positive electrode height and the negative electrode height derived from the variation in production, i.e., the ratio between the positive electrode height and the negative electrode height, for preventing the internal short circuit resulting from the gel leakage. The present invention offers guidelines on an allowable range of the ratio between the positive electrode height and the negative electrode height.

Hereinafter, the present invention will be described by way of an embodiment with reference to the drawings. It will be understood that the present invention is not limited to the following embodiments.

FIG. 2 is a half-sectional view illustrating the structure of an alkaline battery according to an embodiment of the present invention. As shown in FIG. 2, a positive electrode 2 and a gel negative electrode 3 are placed in a cylindrical battery case 1 having a bottom with a separator 4 interposed therebetween. An opening of the battery case 1 is sealed by a sealing unit 9 integrally consisted of a gasket 5, a negative electrode current collector 6, and a negative electrode terminal plate 7. The positive electrode 2 contains manganese dioxide as a positive electrode active material and the negative electrode 3 is a gel negative electrode containing zinc (including a zinc alloy) as a negative electrode active material. The positive and negative electrodes 2 and 3 are reduced in filling density.

Table 2 shows the evaluation results of a drop test performed in the same manner as that of Table 1 on LR6 alkaline batteries manufactured using the positive electrode 2 containing manganese dioxide at a reduced filling density in a range of 2.31 to 2.45 g/cm$^3$ and the negative electrode 3 containing zinc at a reduced filling density in a range of 1.49 to 1.65 g/cm$^3$. The ratio (h1/h2) between the height of the positive electrode 2 (h1) and the height of the negative electrode 3 (h2) was varied in a range of 0.94 to 1.08.

TABLE 2

| | | Filling density of manganese dioxide in positive electrode (g/cm$^3$) | | | | | | | | | | |
|---|---|---|---|---|---|---|---|---|---|---|---|---|
| | | 2.45 | | | | 2.38 | | | | 2.31 | | |
| | | | Drop test result | | | | Drop test result | | | | Drop test result | |
| | | h1/h2 | A | B | C | h1/h2 | A | B | C | h1/h2 | A | B | C |
| Filling density of zinc in negative electrode (g/cm$^3$) | 1.65 | 0.94 | 3/10 | 2/10 | 1/10 | 0.94 | 6/10 | 4/10 | 2/10 | 0.94 | 7/10 | 5/10 | 3/10 |
| | | 0.96 | 2/10 | 0/10 | 0/10 | 0.96 | 2/10 | 2/10 | 0/10 | 0.96 | 3/10 | 2/10 | 0/10 |
| | | 0.98 | 1/10 | 0/10 | 0/10 | 0.98 | 0/10 | 0/10 | 0/10 | 0.98 | 3/10 | 0/10 | 0/10 |
| | | 1.00 | 0/10 | 0/10 | 0/10 | 1.00 | 0/10 | 0/10 | 0/10 | 1.00 | 0/10 | 0/10 | 0/10 |
| | | 1.02 | 0/10 | 0/10 | 0/10 | 1.02 | 0/10 | 0/10 | 0/10 | 1.02 | 0/10 | 0/10 | 0/10 |
| | | 1.04 | 0/10 | 0/10 | 0/10 | 1.04 | 1/10 | 0/10 | 0/10 | 1.04 | 1/10 | 0/10 | 0/10 |
| | | 1.06 | 1/10 | 1/10 | 0/10 | 1.06 | 2/10 | 2/10 | 0/10 | 1.06 | 2/10 | 1/10 | 0/10 |
| | | 1.08 | 2/10 | 1/10 | 0/10 | 1.08 | 2/10 | 2/10 | 1/10 | 1.08 | 4/10 | 2/10 | 1/10 |
| | 1.57 | 0.94 | 3/10 | 1/10 | 1/10 | 0.94 | 5/10 | 4/10 | 3/10 | 0.94 | 8/10 | 5/10 | 2/10 |
| | | 0.96 | 2/10 | 1/10 | 0/10 | 0.96 | 3/10 | 1/10 | 0/10 | 0.96 | 5/10 | 2/10 | 0/10 |
| | | 0.98 | 1/10 | 0/10 | 0/10 | 0.98 | 1/10 | 0/10 | 0/10 | 0.98 | 2/10 | 0/10 | 0/10 |
| | | 1.00 | 0/10 | 0/10 | 0/10 | 1.00 | 0/10 | 0/10 | 0/10 | 1.00 | 0/10 | 0/10 | 0/10 |
| | | 1.02 | 0/10 | 0/10 | 0/10 | 1.02 | 0/10 | 0/10 | 0/10 | 1.02 | 0/10 | 0/10 | 0/10 |
| | | 1.04 | 0/10 | 0/10 | 0/10 | 1.04 | 1/10 | 0/10 | 0/10 | 1.04 | 2/10 | 0/10 | 0/10 |
| | | 1.06 | 3/10 | 1/10 | 0/10 | 1.06 | 2/10 | 2/10 | 0/10 | 1.06 | 3/10 | 1/10 | 0/10 |
| | | 1.08 | 4/10 | 2/10 | 0/10 | 1.08 | 4/10 | 3/10 | 1/10 | 1.08 | 5/10 | 2/10 | 1/10 |
| | 1.49 | 0.94 | 5/10 | 4/10 | 2/10 | 0.94 | 7/10 | 6/10 | 2/10 | 0.94 | 8/10 | 4/10 | 3/10 |
| | | 0.96 | 4/10 | 2/10 | 0/10 | 0.96 | 4/10 | 2/10 | 0/10 | 0.96 | 6/10 | 3/10 | 0/10 |
| | | 0.98 | 2/10 | 0/10 | 0/10 | 0.98 | 2/10 | 0/10 | 0/10 | 0.98 | 3/10 | 0/10 | 0/10 |
| | | 1.00 | 0/10 | 0/10 | 0/10 | 1.00 | 0/10 | 0/10 | 0/10 | 1.00 | 0/10 | 0/10 | 0/10 |

TABLE 2-continued

| | Filling density of manganese dioxide in positive electrode (g/cm³) | | | | | | | | | | |
|---|---|---|---|---|---|---|---|---|---|---|---|
| | 2.45 | | | | 2.38 | | | | 2.31 | | |
| | | Drop test result | | | | Drop test result | | | | Drop test result | | |
| h1/h2 | A | B | C | h1/h2 | A | B | C | h1/h2 | A | B | C |
| 1.02 | 0/10 | 0/10 | 0/10 | 1.02 | 0/10 | 0/10 | 0/10 | 1.02 | 0/10 | 0/10 | 0/10 |
| 1.04 | 2/10 | 0/10 | 0/10 | 1.04 | 1/10 | 0/10 | 0/10 | 1.04 | 2/10 | 0/10 | 0/10 |
| 1.06 | 3/10 | 1/10 | 0/10 | 1.06 | 3/10 | 2/10 | 0/10 | 1.06 | 5/10 | 3/10 | 0/10 |
| 1.08 | 6/10 | 2/10 | 0/10 | 1.08 | 5/10 | 3/10 | 1/10 | 1.08 | 6/10 | 3/10 | 2/10 |

The results shown in Table 2 offers useful guidelines on an allowable range of a balance between the height of the positive electrode 2 and the height of the negative electrode 3 derived from the variation in production, i.e., an allowable range of the ratio (h1/h2) between the height of the positive electrode 2 (h1) and the height of the negative electrode 3 (h2), for preventing the internal short circuit resulting from the gel leakage in the battery using the positive and negative electrodes 2 and 3 reduced in filling density.

When the filling density of manganese dioxide in the positive electrode 2 is set within a range of 2.31 to 2.45 g/cm³, and the filling density of zinc in the negative electrode 3 is set within a range of 1.49 to 1.65 g/cm³, it is preferable, as understood from the evaluation results in the columns C in Table 2, that the ratio (h1/h2) between the positive electrode height (h1) and the negative electrode height (h2) is set within a range of 0.96 to 1.06 for preventing the heat generation in the battery due to the internal short circuit resulting from the gel leakage, even when the battery receives an impact of the drop.

In order to prevent the gradual internal short circuit resulting from the gel leakage, it is more preferable that the ratio (h1/h2) between the positive electrode height (h1) and the negative electrode height (h2) is set within a range of 0.98 to 1.04, as understood from the evaluation results in columns B in Table 2.

In the present embodiment, the aforementioned preferable range of the ratio (h1/h2) between the positive electrode height (h1) and the negative electrode height (h2) is established in consideration of the variation in production. As the variation in production inevitably occurs in a different way depending on the specifications of the battery, the preferable range can be provided as a design allowable range taking the variation in production into account.

The term "filling density of manganese dioxide" mentioned in the present invention denotes a ratio by weight of manganese dioxide contained in electrolytic manganese dioxide constituting the positive electrode 2 to the volume of the positive electrode 2. For example, the "filling density of manganese dioxide" can be measured in the following manner.

Specifically, the volume of the positive electrode 2 is calculated by measuring an outer diameter, an inner diameter and a height of the positive electrode 2 by means of X-ray radiography of the battery. Then, the battery is disassembled, and the whole positive electrode 2 is taken out and sufficiently dissolved in acid. An insoluble matter is filtered out to obtain an aqueous solution, and the manganese (Mn) content in the aqueous solution is checked by ICP emission spectrometry (high frequency induced plasma emission spectrometry). The obtained content is converted to the amount of manganese dioxide to obtain the weight of manganese dioxide contained in the positive electrode 2. The "filling density of manganese dioxide" can be obtained in this manner.

The term "filling density of zinc" mentioned in the present invention denotes a ratio by weight of zinc constituting the negative electrode 3 to the volume of the negative electrode 3. For example, the "filling density of zinc" can be measured in the following manner.

Specifically, the volume of the negative electrode 3 is calculated by measuring an outer diameter and a height of the negative electrode 3 by means of X-ray radiography of the battery. Then, the battery is disassembled, and the whole negative electrode 3 is taken out. A water soluble material and a gelling agent are removed from the negative electrode 3 by decantation using water as a solvent. Subsequently, the resulting product is sufficiently dried to extract zinc, and its weight is measured. The "filling density of zinc" can be obtained in this way.

Table 3 shows the evaluation results of a drop test performed in the same manner as that of Table 2 on the batteries manufactured using the positive and negative electrodes not reduced in filling density (the filling density of manganese dioxide was 2.50 g/cm³, the filling density of zinc was 1.72 g/cm³). The ratio (h1/h2) between the positive electrode height (h1) and the negative electrode height (h2) was varied in a range of 0.90 to 1.10. As shown in Table 3, even when the ratio (h1/h2) between the positive electrode height (h1) and the negative electrode height (h2) exceeds the range corresponding to the variation in production (typically about 2 to 4%), for example, when h1/h2=0.90 or 1.10, the heat generation of the battery due to the internal short circuit resulting from the gel leakage did not occur. Thus, for preventing the internal short circuit resulting from the gel leakage in the batteries using the positive and negative electrodes reduced in filling density, the ratio (h1/h2) between the positive electrode height (h1) and the negative electrode height (h2) is an important parameter that should be controlled in the production process.

TABLE 3

| | | Filling density of manganese dioxide (g/cm³) | | | |
|---|---|---|---|---|---|
| | | 2.50 | | | |
| | | | Drop test result | | |
| | | h1/h2 | A | B | C |
| Filling density of zinc (g/cm³) | 1.72 | 0.90 | 1/10 | 0/10 | 0/10 |
| | | 0.95 | 0/10 | 0/10 | 0/10 |
| | | 1.00 | 1/10 | 0/10 | 0/10 |
| | | 1.05 | 2/10 | 0/10 | 0/10 |
| | | 1.10 | 0/10 | 0/10 | 0/10 |

As described above, the positive electrode reduced in filling density is likely to move upon impact on the battery.

However, the movement of the positive electrode can be suppressed by improving the close contact between the positive electrode and the battery case.

Table 4 shows the evaluation results of the drop test performed in the same manner as that of Table 2 on the batteries manufactured with an arithmetic surface roughness (Ra) of an inner wall surface of the battery case 1 varied within a range of 0.5 to 3.0 μm. As shown in Table 4, the internal short circuit resulting from the gel leakage (rank A, B) became less likely to occur with the increase in arithmetic surface roughness (Ra) of the inner wall surface of the battery case 1. This indicates that the increased surface roughness of the inner wall surface of the battery case 1 improved the adhesion between the positive electrode and the battery case.

However, when the zinc fine powder content exceeds 40 wt %, the negative electrode is increased in viscosity, and the productivity may possibly deteriorate. Therefore, as shown in Table 5, it is preferable to set the fine zinc powder content within a range of 15 to 40 wt % for effectively making the internal short circuit resulting from the gel leakage less likely to occur. The batteries shown in Table 5 were prepared using the positive electrode 2 in which the filling density of manganese dioxide was 2.31 g/cm$^3$ and the negative electrode 3 in which the filling density of zinc was 1.49 g/cm$^3$.

The separator 4, which is in contact with the gasket at its end, functions to prevent the leakage of the gel negative

TABLE 4

| | Average roughness of inner wall surface of case: Ra (μm) | | | | | | | | | | | | | | |
|---|---|---|---|---|---|---|---|---|---|---|---|---|---|---|---|
| | 0.5 Drop test result | | | 0.7 Drop test result | | | 1.2 Drop test result | | | 2.0 Drop test result | | | 3.0 Drop test result | | |
| h1/h2 | A | B | C | A | B | C | A | B | C | A | B | C | A | B | C |
| 0.96 | 6/10 | 3/10 | 0/10 | 4/10 | 1/10 | 0/10 | 3/10 | 1/10 | 0/10 | 2/10 | 0/10 | 0/10 | 2/10 | 0/10 | 0/10 |
| 0.98 | 3/10 | 0/10 | 0/10 | 1/10 | 0/10 | 0/10 | 1/10 | 0/10 | 0/10 | 0/10 | 0/10 | 0/10 | 0/10 | 0/10 | 0/10 |
| 1.04 | 2/10 | 0/10 | 0/10 | 2/10 | 0/10 | 0/10 | 1/10 | 0/10 | 0/10 | 2/10 | 0/10 | 0/10 | 2/10 | 0/10 | 0/10 |
| 1.06 | 5/10 | 3/10 | 0/10 | 5/10 | 3/10 | 0/10 | 4/10 | 2/10 | 0/10 | 4/10 | 2/10 | 0/10 | 4/10 | 2/10 | 0/10 |

However, when the arithmetic surface roughness (Ra) exceeds 2.0 μm, the surface area of the inner wall surface of the battery case 1 increases, and gas is likely to generate. This may possibly bring about reduction in resistance against leakage. Therefore, as shown in Table 4, it is preferable to set the arithmetic surface roughness (Ra) of the inner wall surface of the battery case 1 within a range of 0.7 to 2.0 μm for making the internal short circuit resulting from the gel leakage less likely to occur. The batteries shown in Table 4 were manufactured using the positive electrode 2 in which the filling density of manganese dioxide was 2.31 g/cm$^3$ and the negative electrode 3 in which the filling density of zinc was 1.49 g/cm$^3$.

Regarding the negative electrode, the network of zinc can be improved by increasing the content of fine-grained zinc powder, so that the negative electrode moves less.

Table 5 shows the evaluation results of the drop test performed in the same manner as that of Table 2 on the batteries prepared with the content of zinc powder having a particle size of 200 mesh or lower (hereinafter referred to as "fine zinc powder") varied within a range of 10 to 40 wt %. As shown in Table 5, the internal short circuit resulting from the gel leakage (rank A, B) became less likely to occur with the increase in fine zinc powder content.

electrode 3 toward the positive electrode 2. The function of the separator 4 can be enhanced by increasing the thickness of the separator 4. This may be effective in suppressing loose contact between the separator 4 and the gasket 5 caused by the movement of the positive electrode.

Table 6 shows the evaluation results of the drop test performed in the same manner as that of Table 2 on the batteries prepared with the thickness of the separator 4 varied within a range of 315 to 650 μm. The separator 4 was a three-turn, cylindrical separator made of a 100-210 μm thick nonwoven fabric obtained by mixing polyvinyl alcohol fibers and rayon fibers. As shown in Table 6, the internal short circuit resulting from the gel leakage (rank A, B) became less likely to occur with the increase in thickness of the separator 4.

TABLE 5

| | Content of zinc powder < 200 mesh (%) | | | | | | | | | | | |
|---|---|---|---|---|---|---|---|---|---|---|---|---|
| | 10 Drop test result | | | 15 Drop test result | | | 25 Drop test result | | | 40 Drop test result | | |
| h1/h2 | A | B | C | A | B | C | A | B | C | A | B | C |
| 0.96 | 6/10 | 3/10 | 0/10 | 5/10 | 2/10 | 0/10 | 4/10 | 2/10 | 0/10 | 4/10 | 2/10 | 0/10 |
| 0.98 | 3/10 | 0/10 | 0/10 | 2/10 | 0/10 | 0/10 | 2/10 | 0/10 | 0/10 | 2/10 | 0/10 | 0/10 |
| 1.04 | 2/10 | 0/10 | 0/10 | 1/10 | 0/10 | 0/10 | 0/10 | 0/10 | 0/10 | 0/10 | 0/10 | 0/10 |
| 1.06 | 5/10 | 3/10 | 0/10 | 3/10 | 1/10 | 0/10 | 2/10 | 1/10 | 0/10 | 2/10 | 1/10 | 0/10 |

TABLE 6

| | Separator thickness (μm) | | | | | | | | | | | | | |
|---|---|---|---|---|---|---|---|---|---|---|---|---|---|---|
| | 315 Drop test result | | | 350 Drop test result | | | 450 Drop test result | | | 550 Drop test result | | | 650 Drop test result | | |
| h1/h2 | A | B | C | A | B | C | A | B | C | A | B | C | A | B | C |
| 0.96 | 6/10 | 3/10 | 0/10 | 4/10 | 2/10 | 0/10 | 3/10 | 1/10 | 0/10 | 2/10 | 0/10 | 0/10 | 2/10 | 0/10 | 0/10 |
| 0.98 | 3/10 | 0/10 | 0/10 | 2/10 | 0/10 | 0/10 | 2/10 | 0/10 | 0/10 | 0/10 | 0/10 | 0/10 | 0/10 | 0/10 | 0/10 |
| 1.04 | 2/10 | 0/10 | 0/10 | 2/10 | 0/10 | 0/10 | 2/10 | 0/10 | 0/10 | 1/10 | 0/10 | 0/10 | 1/10 | 0/10 | 0/10 |
| 1.06 | 5/10 | 3/10 | 0/10 | 5/10 | 2/10 | 0/10 | 4/10 | 3/10 | 0/10 | 4/10 | 2/10 | 0/10 | 4/10 | 2/10 | 0/10 |

However, when the thickness of the separator 4 exceeds 550 μm, the positive electrode 2 and the negative electrode 3 are reduced in volume. Therefore, as shown in Table 6, the thickness of the separator 4 is preferably set within a range of 350 to 550 μm for effectively making the internal short circuit resulting from the gel leakage less likely to occur. The batteries shown in Table 6 were prepared using the positive electrode 2 in which the filling density of manganese dioxide was 2.31 g/cm$^3$ and the negative electrode 3 in which the filling density of zinc was 1.49 g/cm$^3$.

The arithmetic surface roughness (Ra) of the inner wall surface of the battery case 1, the content of the zinc powder having a particle size of 200 mesh or lower, and the thickness of the separator 4, of suitable values within the above-described effective ranges, can appropriately be combined for effectively reducing the occurrences of the internal short circuit resulting from the gel leakage.

The present invention has been described by way of the preferred embodiments. However, the present invention is not limited to the above embodiments, and various modifications are possible. For example, the present invention can also be effective for alkaline batteries of other sizes than the LR6 alkaline batteries described in the above embodiment.

INDUSTRIAL APPLICABILITY

The alkaline battery of the present invention has excellent productivity and high cost performance, and is applicable to a wide variety of electronic devices using dry batteries as a power source.

EXPLANATION OF REFERENCE NUMERALS

Figure 1A:
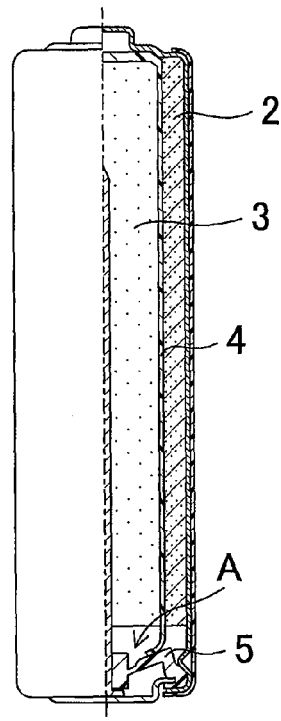
FIG. 1(*a*) is a view illustrating the structure of a battery, FIG. 1(*b*) is a view of the battery after being dropped, FIG. 1(*c*) is an X-ray photograph of the battery of FIG. 1(*a*), and FIG. 1(*d*) is an X-ray photograph of the battery of FIG. 1(*b*).
Figure 1B:
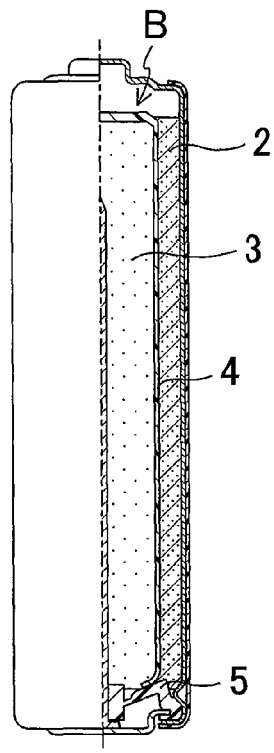
Figure 1C:
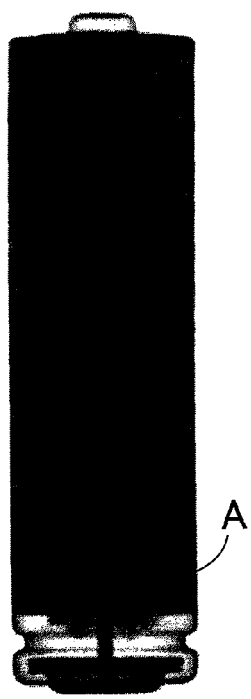
Figure 1D:
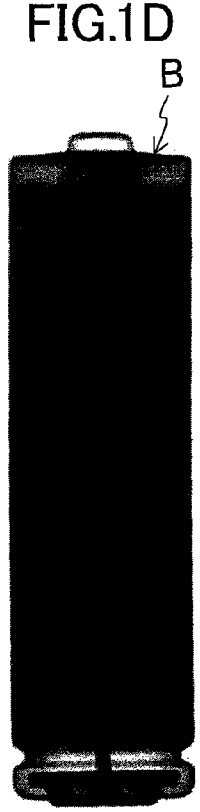
Figure 2:
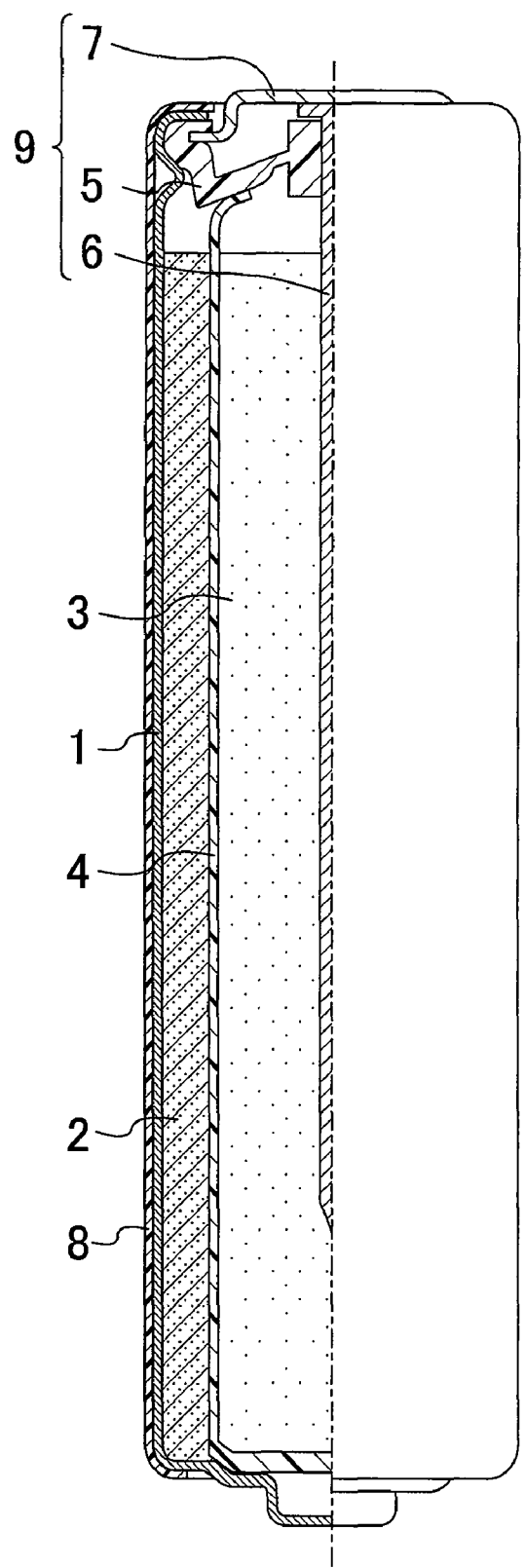
FIG. 2 is a half sectional view illustrating the structure of an alkaline battery according to an embodiment of the present invention.

1 Battery case
2 Positive electrode
3 Gel negative electrode
4 Separator
5 Gasket
6 Negative electrode current collector
7 Negative electrode terminal plate
9 Sealing unit

The invention claimed is:

1. An alkaline battery comprising: a positive electrode and a negative electrode placed in a battery case with a separator interposed therebetween, wherein
   the positive electrode contains manganese dioxide as a positive electrode active material,
   the negative electrode is a gel negative electrode containing zinc as a negative electrode active material,
   a filling density of manganese dioxide in the positive electrode is in a range of 2.31 to 2.45 g/cm$^3$,
   a filling density of zinc in the negative electrode is in a range of 1.49 to 1.65 g/cm$^3$, and
   a ratio (h1/h2) between a height of the positive electrode (h1) and a height of the negative electrode (h2) is in a range of 0.96 to 1.06.
2. The alkaline battery of claim 1, wherein
the ratio (h1/h2) between the height of the positive electrode (h1) and the height of the negative electrode (h2) is in a range of 0.98 to 1.04.
3. The alkaline battery of claim 2, wherein
an arithmetic surface roughness (Ra) of an inner wall surface of the battery case is in a range of 0.7 to 2.0 μm.
4. The alkaline battery of claim 1, wherein
the zinc is zinc powder, in which zinc powder having a particle size of 200 mesh or lower is contained in a range of 15 to 40 wt %.
5. The alkaline battery of claim 1, wherein
the separator has a thickness in a range of 350 to 550 μm.
6. The alkaline battery of claim 2, wherein
the zinc is zinc powder, in which zinc powder having a particle size of 200 mesh or lower is contained in a range of 15 to 40 wt %.
7. The alkaline battery of claim 2, wherein
the separator has a thickness in a range of 350 to 550 μm.

* * * * *